United States Patent [19]

Lane

[11] 4,075,643
[45] Feb. 21, 1978

[54] FILM-ENGAGING MECHANISM AND TRANSPORT RECEPTACLE THEREFOR

[75] Inventor: William P. Lane, Taunton, Mass.

[73] Assignee: Polaroid Corporation, Cambridge, Mass.

[21] Appl. No.: 721,856

[22] Filed: Sept. 9, 1976

[51] Int. Cl.² .................. G03B 17/52; G03B 17/26
[52] U.S. Cl. ................................. 354/86; 354/276
[58] Field of Search .............. 354/83, 84, 85, 86, 354/275, 276

[56] References Cited

U.S. PATENT DOCUMENTS

| | | | |
|---|---|---|---|
| 3,779,770 | 12/1973 | Alston et al. | 354/86 X |
| 3,974,510 | 8/1976 | Ivester | 354/86 |
| 3,994,006 | 11/1976 | Ichii | 354/85 X |
| 4,023,191 | 5/1977 | Augustin, Jr. et al. | 354/86 |

Primary Examiner—Edna M. O'Connor
Attorney, Agent, or Firm—David R. Thornton

[57] ABSTRACT

A film-engaging mechanism for incorporation in a camera which uses self-developing film has a unitary transport receptacle for a film cassette and a processor for developing the film. The receptacle houses a replaceable film cassette, positions it to align the foremost film unit therein at the image surface of the camera, and advances each film unit for transport to the processor. The receptacle also aligns the processor to receive each advancing film unit and subjects it to the critical operations that assure proper photographic development. The transport receptacle is well-suited for construction with a unitary compartment-forming frame formed of a single metal sheet, and which requires only few additional parts to complete the unit.

17 Claims, 6 Drawing Figures

FILM-ENGAGING MECHANISM AND TRANSPORT RECEPTACLE THEREFOR

BACKGROUND

This invention relates to a mechanism for incorporation in a photographic camera for handling self-developing photographic film and for processing it after exposure. The mechanism provides all the film-engaging structure for a camera of the self-developing type, but leaves other elements of the camera free for design independent of film-engaging requirements. The invention also provides a unitary transport receptacle for such a film-engaging mechanism.

The invention enables persons not skilled in the handling and processing of self-developing film to configure cameras in many varied ways and, by incorporating the mechanism of the invention, consistently to obtain high quality photographs.

The processing of self-developing film, to transform the latent image impressed thereon by exposure to a permanent visible image, is a complex process which requires the precise control of many parameters. Consider for example the processing of self-developing film of the type available from the Polaroid Corporation in Cambridge, Mass. for use in that company's cameras sold under the registered designation SX-70 and PRONTO! This film is in the form of separate card-like film units, each of which has a multi-layer construction with an opaque back and a photo-sensitive front and which carries along one margin a set of rupturable pods containing fluid photoprocessing composition. After exposure, the film unit is advanced through a slot in the film-storing cassette to transport it from the cassette to the nip between a pair of spread rollers. The spread rollers rupture the pods and spread the photoprocessing composition between layers of the film unit across the entire photosensitive surface.

Successful processing of each film unit in this manner depends on numerous factors, including the shape of each roller and the force between them, the physical constraints on the film unit as it exits the cassette slot and spans the space from there to the roller nip, the configuration of the film unit during engagement with the rollers and thereafter, and the masking of light from the film unit for a brief interval after passage through the rollers. These and related factors typically are carefully controlled, with structures that are dimensioned with tolerances measured in terms of ten-thousandths of an inch, i.e. 0.0001 inch.

The manufacture of self-developing cameras is more likely to become available to numerous firms provided each film producer is assured that cameras of others process the film correctly. This is necessary to ensure customer satisfaction with the film and thereby preserve the reputation of the film producer. However, it is likely to be excessively costly for each camera manufacturer to develop its own expertise to provide a film handling and processing mechanism that meets the exact requirements noted above.

Therefore, it is an object of this invention to provide a separable camera mechanism for providing the film-engaging operations for a self-developing camera, and which imposes minimal restraint on other functions and aspects of the camera.

Another object of the invention is to provide a mechanism of the above character suited for incorporation in cameras of varied design and configuration. It is also an object to provide a mechanism of the above type which is relatively low in manufacturing cost, and which is compact in size.

Thus it is an object of the invention to provide a mechanism for incorporation in cameras designed by others and which a film supplier can provide to assure that its self-developing film is handled and processed in the exacting manner required for reliable top quality performance.

It is also an object of the invention to provide a unitary transport receptacle for a film-engaging mechanism of the above type and which provides at least the film storage, positioning, and initial transport operations for a self-developing camera, and which configures and constrains the film for proper feed into the processing rollers.

Further objects of the invention are to provide a transport-receptacle of the above type which employs construction techniques and materials familiar to the camera industry, and suited for relatively efficient manufacture even in comparatively small volume.

Other objects of the invention will in part be obvious and will in part appear hereinafter.

SUMMARY OF THE INVENTION

The invention attains the foregoing and further objectives by providing a mechanism which can be incorporated in a self-developing camera to provide the operations which involve engaging the film, including the film-housing cassette. The mechanism has two major portions, a transport receptacle and a processor. The receptacle includes a compartment-forming frame or unitary construction that receives and positions the replaceable film cassette. The frame mounts the film-advancing pick which indexes a film unit out of the cassette and feeds it to the processor, mounts bottom-wall spring members which urge the cassette into position, and includes a stiff plate member which bears against the advancing film unit to constrain and configure it for proper processing. Further structure of the receptacle frame hingedly mounts the processor for proper alignment with the advancing film unit and, alternatively, for selective displacement to allow replacement of a film cassette. The receptacle also can mount, without modification, electrical contacts for connection to a battery in the film cassette.

The compartment-forming frame is well suited for manufacture from a single piece of sheet metal, and this sheet structure forms many required elements of the transport receptacle. Thus the complete receptacle preferably consists only of the sheet-metal frame and a few separate parts affixed to it. Further, the same receptacle can be used without modification either with an optional closure panel or without it, depending on the design of the camera in which it is to be incorporated.

The processor provides the now-conventional pair of spread rollers that form a film-engaging nip, the film-deflecting spread bar, and the retractable shade that covers a film unit as it emerges from the spread rollers.

The invention accordingly provides a film handling and processing mechanism which a camera manufacturer can purchase as a unit, typically from a film producer, and incorporate in the manufacturer's own camera. The mechanism provides all the film storage, positioning, transport, processing, and other handling in the camera. The film supplier accordingly is assured that a camera which uses the mechanism will properly process the film. On the other hand, the mechanism leaves the camera manufacturer essentially free of film-engaging constraints in the design and construction of other aspects of the camera, such as the overall design and style, the optical system, and the shutter and exposure control elements. Also, the relatively few interconnections of the film-engaging mechanism with other parts of the camera are convenient to provide. The mechanism is accordingly readily incorporated in a camera, operates in different orientations, and is relatively compact and low in cost.

The sheet-metal construction of the receptacle frame provides further advantages, one of which is familiarity and acceptance in the camera industry. Another is that it does not require extensive tooling costs and hence is relatively economical to manufacture.

Many functions which a film handling and processing mechanism embodying the invention provides are present in current self-developing cameras, including those identified above, and are disclosed in numerous earlier-filed patents and patent applications, including among others the commonly-assigned application Ser. No. 554,779 of B. K. Johnson et al filed Mar. 3, 1975 for "Photographic Apparatus Having Film Container Locating Structure", now U.S. Pat. No. 3,976,083. Further, patent application Ser. No. 628,486 filed Nov. 4, 1975 of Rolf M. Augustin, Jr. et al for "Camera Back Apparatus", now U.S. Pat. No. 4,023,191, and assigned to the assignee hereof, discloses a camera back for self-developing film for attachment to a camera front body. However, it is considered that the art does not include a separate mechanism for incorporation in a camera to provide all the handling and processing of the self-developing film, but yet which imposes essentially minimal constraints or requirements on the other aspects and features of the camera.

The invention accordingly comprises the features of construction, combination of elements, and arrangement of parts; and includes an article of manufacture having the features, properties, structure, and relation of elements; all as exemplified in the embodiments hereinafter set forth, and the scope of the invention is indicated in the claims.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENT

Figure 1:
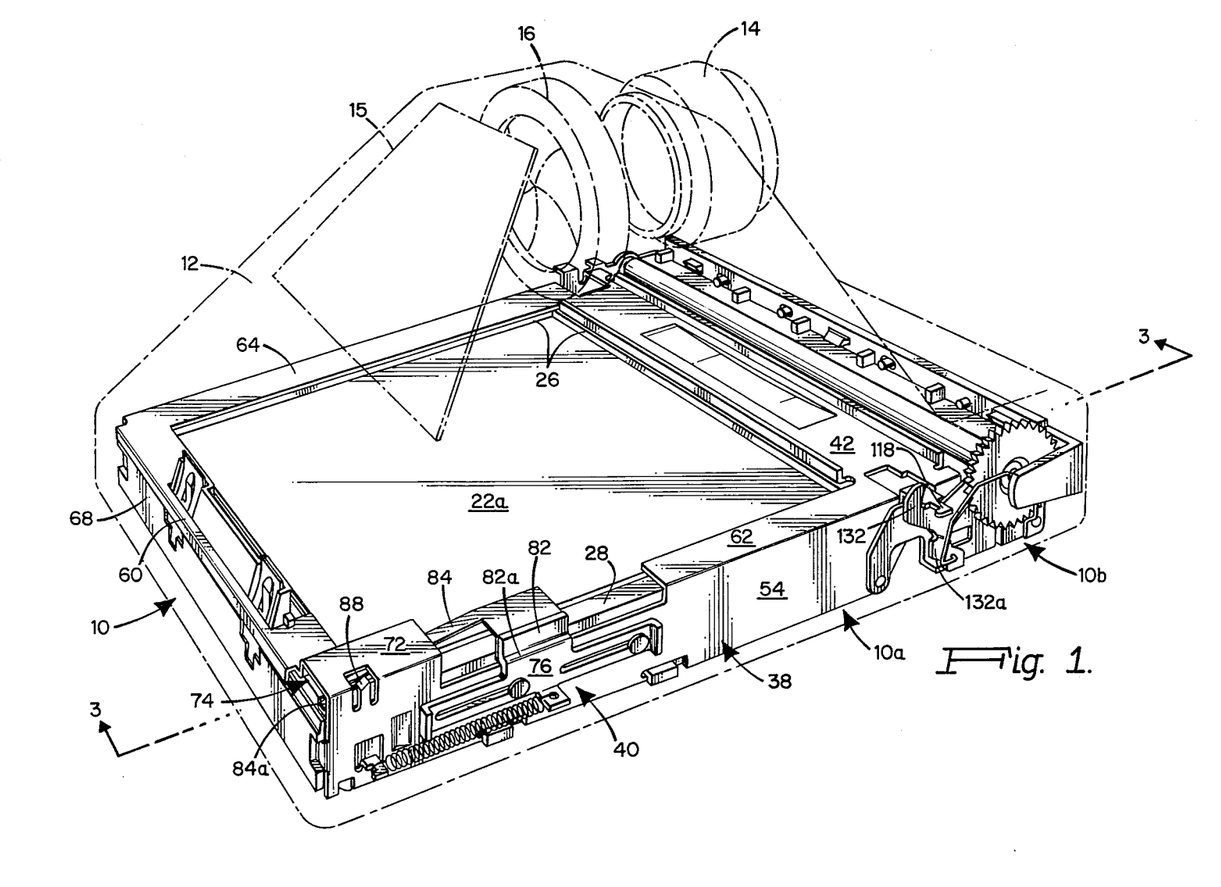
FIG. 1 is a schematic representation of a self-developing camera incorporating a film-engaging mechanism according to the invention.

A self-developing camera as shown in FIG. 1 incorporates a film-engaging mechanism 10 according to the invention within a camera housing 12. The mechanism 10 provides all the functions and operations which involve engagement with the self-developing film, including storage and positioning, transport, and processing. On the other hand, the mechanism 10 imposes minimal constraints on the housing, as well as on other elements of the camera such as the optical system illustrated as incorporating a lens unit 14 and a mirror 15, and the shutter and exposure control elements schematically designated at 16. Accordingly, the camera design can to a large extent be independent of the mechanism 10 and of the exacting requirements for proper engagement of the self-developing film. Correspondingly, the same film-engaging mechanism 10 can be used in cameras of different designs, constructions and styles.

The illustrated film-engaging mechanism 10 is for use with a film assemblage in the form of a cassette which houses a stack of separate card-like film units. This type of film cassette is commercially available from Polaroid Corporation in Cambridge, Mass. for use in cameras sold under the registered designations SX-70 and PRONTO!, and is described in U.S. Pat. No. 3,651,746 of E. H. Land entitled "Film Assemblage". The film units in the cassette, disclosed in U.S. Pat. No. 3,415,644 of E. H. Land for "Novel Photographic Products And The Processes", are stacked with a foremost one available for photographic exposure through an exposure window.

Figure 2:
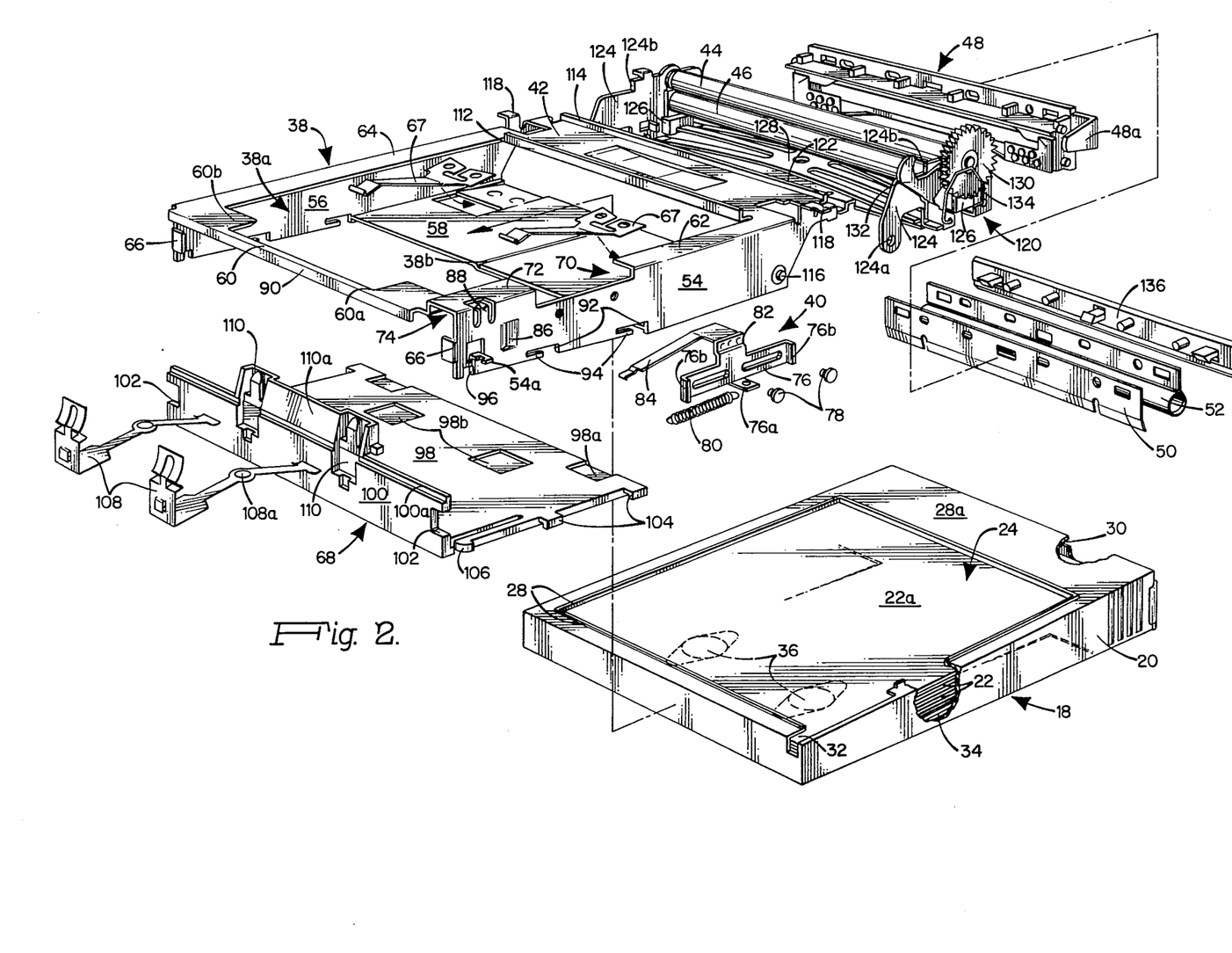
FIG. 2 is an exploded view of a film-engaging mechanism as shown in FIG. 1, with a film cassette.

More particularly, as FIG. 2 shows, the invention is illustrated as operating with a commerically-available film cassette 18 which has a casing 20 that contains a stack of several thin, flexible, individual film units 22 of the self-developing type. The casing has an essentially rectangular configuration of front, back and side walls and the top wall is open to form an exposure window 24 bounded by an upstanding peripheral lip 26 within a peripheral flange 28. The pod of photoprocessing composition of each film unit is located at the front end of the cassette, under the wide flange section 28a. A leaf spring in the casing biases the film units toward the casing top so that the foremost film unit 22a is at the exposure window and hence at the image surface of the camera. The cassette has a frontal exit slot 30, through which the foremost film unit can slide but which is normally optically shielded by a pliable flap. Extending forward from the casing back wall along one side of the cassette is an opening 32 which provides access for a film-advancing pick arm to engage the back marginal edge of the foremost film unit within the cassette, to advance it through the exit slot 30.

The illustrated film cassette 18 also includes a battery 34 for powering such elements of the camera as a film-advancing motor and the exposure control elements. The battery typically is disposed inside the casing 20 on the side opposite the exposure window 24, nested between the leaf spring and the casing back wall. The battery has two terminals 36 which are accessible through openings in the casing bottom wall.

With further reference to FIGS. 1 and 2, the film-engaging mechanism 10 has a transport receptacle 10a and a film processor 10b. The receptacle has a compartment-forming frame 38 that receives the replaceable film cassette 18 and positions it so that the foremost film unit 22a therein is located at the camera image surface for proper focus and exposure. The receptacle includes a pick device 40 which an actuator (not shown) in the camera moves in order to advance an exposed film unit from the film cassette to the processor 10b. A plate member 42 on the front end of the receptacle frame constrains, and preferably depresses, the wide frontal flange portion 28a of the cassette 18, in the manner disclosed in U.S. Pat. No. 3,820,137 of J. J. Driscoll for "Photographic Apparatus".

The processor 10b of the film-engaging unit includes two spread rollers 44, 46 which rupture the film-unit pods and spread the photoprocessing composition. A spreader bar 48 and a deflector blade 50 on the processor configure and deflect the film unit during and after engagement with the spread rollers, and a retractable shade 52 shields the film unit from light during and immediately after processing by the spread rollers.

More particularly, with reference to FIG. 2, the frame 38 of the transport receptacle has a unitary compartment-forming structure with side walls 54 and 56 joined at their lower edges by a bottom wall 58 and at their upper edges by the plate member 42 and by a bridging member 60. The plate member 42 is at the front of the receptacle 10a and the bridging member 60 is at the back. These members 42 and 60, together with top wall members 62 and 64 which extend along the length of the side walls, form a frame top wall that is open with a large centrally-located frame aperture 38a to expose the entire window 24 of a film cassette 18 disposed in the receptacle 10a.

The frame 38 also has back wall portions 66, 66 illustrated as cassette-positioning tabs projecting inward from the back edges of the side walls 54 and 56.

The illustrated bottom wall 58 extends from the front of the frame 38 only part way, typically approximately half way, toward the back of the frame. It has been found that such a partial bottom wall provides ample rigidity for the frame, while minimizing the weight and required amount of material. As detailed hereinafter, an optional closure panel 66 can be secured to the frame to span the open areas at the frame bottom and back.

The foregoing and remaining structure of the receptacle frame 38 preferably is fabricated, as illustrated, from a single metal sheet. The initially-flat sheet is cold worked to form all the apertures, projections and like elements including all folds and bends extending in the transverse direction, i.e. in the direction extending between the side walls 54 and 56, after which the sheet is folded to configure the bottom, side and top walls. Edges of the sheet are overlapped and welded together along the frame bottom to form a longitudinally-extending seam 38b in the bottom wall 58. The structure of the receptacle frame 38 is well suited for fabrication in this manner, which is desired for many reasons including market acceptance, availability of manufacturers, and manufacturing economies.

Figure 3:
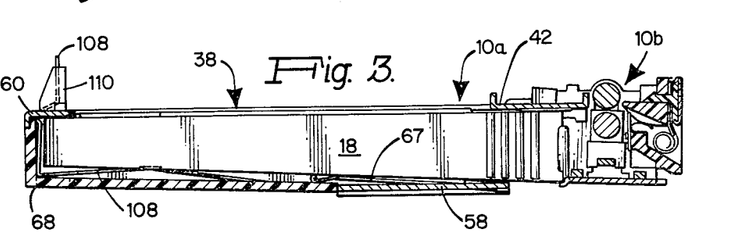
FIG. 3 is a transverse cross-sectional view of the film-engaging unit of FIG. 2, taken along line 3—3 of FIG. 1, with a film cassette nested therein.
Figure 4:
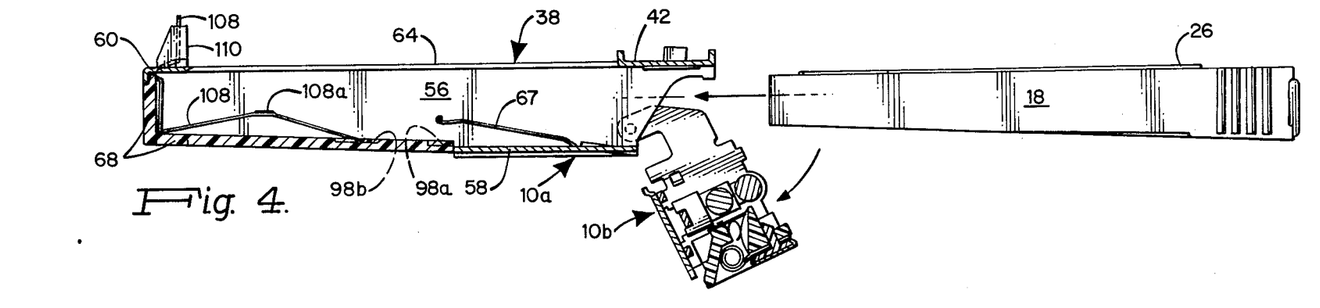
FIG. 4 is a transverse cross-sectional view similar to FIG. 3 illustrating the loading and unloading of the film cassette.

The compartment which the frame top, side and bottom walls and back wall portions thus form is dimensioned to receive a film cassette at the open front end, as FIG. 4 shows, and to seat the cassette therein, positioned by the inner surfaces of the frame walls, as in FIG. 3. That is, a cassette is inserted into the receptacle frame at the open front, with the processor 10b being hingedly moved away as shown in FIG. 4. The cassette is slidable within the top, bottom and side walls until it abuts the back wall portions 66. When fully inserted into the receptacle, the cassette is nested between the side walls and sits flat against the upper wall formed by plate member 42, side members 62 and 64, and panel portions 60a and 60b of the bridging member 60.

In particular, the aperture-defining inner edges of the top wall elements 42, 60a, 60b, 62 and 64 preferably substantially conform with the inner periphery of the cassette flange 28, so that the upstanding cassette lip 26 fits within the frame aperture 38a without interference with the top wall structure. The top wall elements 42, 60a, 60b, 62 and 64 consequently abuttingly engage, and thereby position, the cassette along the cassette flange 28, rather than at the lip 26.

The frame bottom wall 58 preferably mounts a pair of cantilevered spring members 67, 67 which resiliently urge a film cassette against the top wall elements 42, 60a, 60b, 62 and 64. Each spring member has a hook at a free end, a mounting section at the other end, and a spring section extending between the ends. The mounting section is secured to the frame on the outside of the bottom wall 58, to maintain a smooth inside surface, and the spring section extends through an opening in the wall to project upward within the frame compartment (FIG. 4) under the forward portion of the frame aperture 38a. As known from prior camera structures where similar spring members are used, when a film cassette 18 is inserted into the receptacle frame with the proper orientation, it cams the spring members 67 away to pass over them. When the film cassette is fully seated, the spring members resiliently urge it against the top wall elements of the receptacle frame, as in FIG. 3. Another function of the spring members 67 is to prevent the insertion of a film cassette into the receptacle 10a with improper orientation, for in that case the end hooks catch a forward edge of the improperly-oriented cassette and prevent further insertion into the frame compartment.

Figure 5:
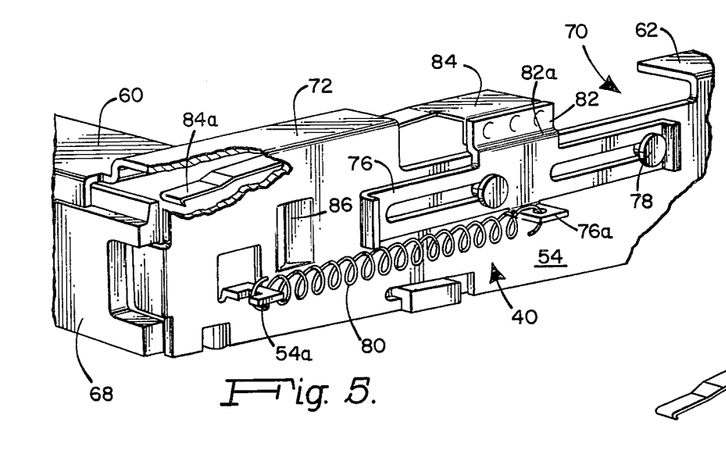
FIG. 5 is an enlarged fragmentary perspective view, partly broken away, showing details of the receptacle construction and pick device shown in FIGS. 1 and 2.

FIGS. 2 and 5 show that the receptacle frame 38 has a pick-accommodating opening 70 which interrupts both the top wall member 62 and the upper portion of side wall 54 for a portion of the frame front-to-back length. Between the opening and the back of the frame, there is a top wall member 72 which is raised above the top wall elements 60a, 60b, 62 and 64; this enlargement provides within the frame compartment a pick-accommodating passage 74 which lies above the access opening 32 of a cassette 18 seated in the frame. The raised wall member 72 joins to the rest of the frame by a step in the sheet metal between it and panel portion 60a, and by an upward extension of the side wall 54.

The pick device 38 has a slide carriage 76 that is apertured with two parallel slots. A pair of headed fasteners 78, extending through the slots and secured to the side wall 54, affix the carriage to the frame below the opening 70 and slidable relative to it along the front-to-back direction. A spring 80 is tensioned between a frame tab 54a projecting out from side wall 54 and a carriage tab 76a, to urge the carriage to a backmost slide position shown in FIG. 1. The carriage 76 has at least one actuator tab 76b, although two are illustrated at opposite ends of the carriage, projecting outward for driving engagement with a pick actuator (not shown) of the camera of FIG. 1 to drive the carriage forward and, if desired, control the return motion to the position of FIG. 1.

The slide carriage 76 also carries a web 80 which projects upward to the opening 70, where the web is stepped inward to provide a shelf 82a which slidably rides on the edge of the side wall 54 at the opening 70.

The web 82 carries a longitudinally-extending pick arm 84 having a hoe-like end 84a which extends within the frame compartment in the enlarged passage 74. When the carriage 76 is in the backmost position of FIG. 1, the backwardly-extending pick arm disposes the end 84a in the access opening 32 of a cassette seated therein and behind the back edge of the foremost film unit 22a. Forward sliding movement of the carriage moves the arm forward to draw that film unit forward, out of the cassette exit slot 30 and into the nip between the rollers 44 and 46 of the processor 10b. U.S. Pat. No. 3,753,392 of E. H. Land for "Film Advancing Apparatus" describes one preferred construction for the pick arm 84, and the operation of it.

As FIG. 5 also shows, the illustrated pick device 40 balances, at least in part, the backwardly-directed pull of the pick arm 84, as transmitted to the carriage 76 by the web 82, with the restoring force of the spring 80. This action, which facilitates attaining smooth sliding motion of the carriage, results from having the arm-carrying web 82 and the spring-engaging tab 76a joined to the carriage at the same longitudinal location but from opposite directions.

The frame side wall 54 has a shoulder 86 projecting into the frame compartment adjacent the pick 40 and preferably, as illustrated, aft of the slide carriage 76. The shoulder is thus located adjacent but closely spaced from the frame back, and it has a slopped forward side to have a triangular cross section in a plane parallel to the elements of the frame top wall. With this configuration, the shoulder 86 engagingly bears against the film cassette 18 to minimize rotational displacement of the cassette within the frame compartment when the pick device 40 is drivingly engaged behind a film unit to advance it out of the cassette. Thus, the shoulder 86 constricts the width of the frame compartment for both relatively accurate positioning of the cassette corner where the access opening 32 is located and to minimize displacement of the cassette due to the press of the pick arm against the foremost film unit. The slopping frontal side of the shoulder 86 facilitates sliding passage of the cassette by it during insertion of the cassette.

The frame side wall 54 also has a cassette-guiding finger 88 (FIGS. 1 and 2) projecting a short distance into the compartment below the raised top wall member 72. The finger, which is angled to present a downwardly-inclined lower surface to a cassette being inserted into the receptacle 10a, engages the cassette flange 28 in the same plane as the top wall elements 42, 62 and 64, and thereby ensures that the cassette does not rise out of position under the raised member 72.

The incorporation of the pick device 40 on the receptacle frame 38 in the foregoing manner assures the requisite proper positioning of the pick arm relative to the foremost film unit in a film cassette seated in the frame compartment. This positioning is desirable for reliable jam-free advancement of the film units from the cassette by means of the pick device.

The structure of the illustrated receptacle frame 38 further includes elements to mountingly seat the separate closure panel 68, FIG. 2. These elements include a lip 90 folded down from the back edge of the frame bridge member 60 and extending along the width of the frame except at the passage 74 under the raised top-wall member 72. In addition, the bottom edge of each side wall 54, 56, along the length where the bottom wall 58 does not extend, is recessed with a pair of mounting openings 92, each having an L-shape to form a finger 94 facing into the opening. There is also a further recess 96 in each side wall bottom edge, adjacent the back of the frame.

The illustrated closure panel 68 has a flat bottom plate 98 and an upstanding back plate 100. The back plate is dimensioned to span the back of the receptacle frame between the side walls, and has an upper tongue 100a that fits underneath the frame lip 90, as shown in FIG. 5. A cut-out 102 in each side of the back plate 100 receives the frame back tabs 66 without interference. The front edge of the closure bottom plate 68, opposite the back panel 100, is straight, and each side edge carries a pair of projecting lugs 104 and an outwardly-projecting resilient latch 106. The two lugs 104, 104 on each side of the closure panel 68 are spaced to fit within the openings 92, 92 of the receptacle frame and engage the finger 94 therein, and the detent of the closure latch 106 fits within the frame recess 96, as FIG. 5 details. More particularly, to assemble the closure panel 68 with the frame 38, the panel is nested between the frame side walls with the lugs 104 received in the openings 92, and with the detent of each latch 106 deflected inward to abut within one frame side wall 54, 56. The closure panel is then offset toward the back of the frame to engage each frame finger 94 under a closure lug 104, to seat the closure tongue 100a against the frame lip 90, and to engage the detent of each latch 106 in a frame recess 96.

The resultant multi-point connections securely join the closure panel 68 to the receptacle frame, but are releasable should it be desired to remove the panel. Moreover, the interconnection accurately positions the panel relative to the frame. Accordingly, the closure panel can include bottom plate depressions 98a located to seat the end of each spring member 67 and thereby support the member, when it is depressed by a cassette as in FIG. 3.

The closure panel 68 can also be fitted with two removable electrical contacts 108, 108, which it disposes for electrical connection with the battery terminals 36 of a cassette seated in the receptacle. Each contact 108 has, as shown in FIG. 2, an overall L-shape with a base portion and a resilient leg portion. The base portion forms the mounting structure for the contact, and the leg portion has a contact pad 108a approximately midway along the length thereof. The closure panel 68 carries contact mounts 110, 110 on the back plate 100 for replaceably mounting the contacts 108 with the base portion of each disposed along the back wall of the receptacle compartment, out of the way of a film cassette 18, and with the leg portion of each resiliently bowing into the compartment from below, as FIG. 4 shows. External electrical connections (not shown) can electrically engage the mounted contacts from outside the receptacle. Upon insertion of a film cassette 18 into the receptacle frame 38, the cassette cams against the leg portion of each contact 108 and deflects that portion underneath the cassette. When the cassette is fully seated in the frame compartment, the contact pads 108a engage the battery terminals 36, as FIG. 3 shows. The contacts 110 are optional, for they are selectively removable from the mounts 110 to allow the closure panel 68 to be used without them in a camera that provides other connections to the cassette battery 34.

The closure panel 68 also is optional, for the camera of FIG. 1 can have a housing section or another member located below the receptacle frame to provide, where desired, similar supportive engagement with battery contacts and/or support for the free ends of the spring elements 67.

The closure panel 68 is preferably molded in one piece of a plastic material to provide both the desired structural properties and electrical insulation of each contact 108. The mounts 110 of the illustrated molded structure project upward from the back panel 100, and a web 110a is preferably molded between the upstanding portions of the mounts and integral with the back panel 100 to enhance the overall strength of the contact mounts.

The two contact mounts and the interconnecting web 110a preferably project forward, above the back wall tongue 110a, to fill the top wall space in the bridging member 60 between the portions 60a and 60b. This closure structure thus provides, with the portions 60a and 60b, an essentially continuous straight border along the back edge of the frame aperture 38a. The molded closure panel further includes two shallow depressions 98b recessing the bottom plate and each located to receive the free end of one contact 110. The depressions guide the sliding movement of the contact free ends when a film cassette is loaded into, and removed from, the receptacle 10a and hence aid in maintaining the contacts properly located.

With further reference to FIG. 2, the plate member 42 is a forward-projecting overhanging extension of the top wall beyond the bottom wall 58. The plate spans the entire width of the receptacle between the side walls 54 and 56 and has upturned front and back edges to form transverse ribs 112 and 114 which strengthen the plate member against deflection transverse to the plane of the top wall. The mid-section of the plate member preferably is coined to form a minor cassette-deflecting projection on the inner surface, in the manner of the above-noted U.S. Pat. No. 3,820,137. The frame side walls 54 and 56 extend forward, at least along their upper edges, with the plate member 42 as shown.

To mount and position the processor 10b relative to the transport receptacle 10a, the receptacle frame 38 carries a hinge pin 116 projecting outward from each side wall 54, 56. The hinge pins can be cold-formed from the metal sheet of the frame 38 with a semi-punch operation which simultaneously forms a washer-like boss concentrically around each pin. A processor-positioning tab 118 projects from each side of the frame above the plate member 42; this tab abuts a locating shoulder on the processor to fix it in the proper rotational position for film processing. One tab also engages a latch plate on the processor to hold it in this position, which is the position shown in FIGS. 1 and 3.

It will now be seen that the foregoing film-engaging transport receptacle 10a stores and positions a replaceable film cassette, indexes an exposed film unit out of the cassette slot for transport to the film processor, and selectively deflects the cassette adjacent the exit slot. The receptacle is suited for construction with a one-piece sheet metal frame to which the pick device and the optional closure panel 68 are readily mounted. That is, the preferred sheet metal fabrication forms all the structure of the transport receptacle except the pick device 40, the spring members 67, the battery-engaging contacts 108, and the closure 68. The sheet metal compartment-forming structure, moreover, readily assembles with these separate parts. In addition, it readily can have both the rigidity and the close dimensional tolerances desired for proper engagement with self-developing film units; and it is highly compact, light weight, and relatively economical to manufacture.

The illustrated processor 10b is structured similar to corresponding elements in the PRONTO! camera noted above and as detailed in U.S. Pat. No. 3,974,510 of A. S. Ivester and in the pending commonly-assigned patent application Ser. No. 648,632 of Andrew S. Ivester and Bruce K. Johnson for "Fluid Spreading Apparatus", now abandoned, the disclosures of which are incorporated herein by reference. Accordingly, the processor 10b includes, as shown in FIG. 2, a U-shaped bracket 120 having a base 122 and upstanding sides 124, 124. The top roller 44 mounts to the bracket sides with plastic bearings. The lower roller 46 mounts to the bracket sides by way of bearing blocks 126, 126 that fix the minimal spacing between the two rollers, and a leaf-type spring 128 seats on the bracket base 122 to urge the bearing blocks to maintain this inter-roller spacing. To drive the rollers, the roller 44 carries a gear 130 which is located outboard of one bracket side 124 for access to engage whatever drive element the camera of FIG. 1 employs.

The processor 10b is hingedly mounted to the receptacle 10a by engagement of the frame pins 116 in pivot holes 124a in the bracket sides. A latch plate 132 is pivotally mounted outside one bracket side 124 releasably to engage one outwardly-projecting frame tabs 118, as shown in FIG. 1, and a wire spring 134 biases the latch plate 132 into the latching position. A shoulder 132a on the latch plate is accessible to rotate it counter-clockwise, against the bias of spring 134, to release the plate from the frame tab 118. Further, each frame tab 118 abuts a shoulder 124b on each bracket side to fix the rotational position of the processor relative to the receptacle when the two elements are latched together, FIG. 3.

In this position, the roller nip is aligned in the path of a film unit which the pick device 40 advances out of a film cassette. Accordingly, the advancing film unit feeds into the roller nip, and is advanced further by the driven rotation of the top roller 44.

When the latch plate 132 is disengaged from the frame tab 118, the processor is free to rotate clockwise from the position of FIG. 3 to the position of FIG. 4. Here the processor is displaced away from the front of the receptacle 10a and is out of the path of a film cassette being loaded into or removed from the receptacle.

As noted above, the film-engaging processor 10b also includes a spreader bar 48, a film-deflecting blade 50, and a film-shielding optical shade 52. A snap-fitting mounting bar 136, FIG. 2, secures the blade and the shade to the spreader bar 48. The spreader bar, in turn, snap fits onto the processor bracket 120, suitably nesting between the bracket sides 124 and secured therein with projecting lugs received in mating apertures. A spring-retaining arm 48a on the bar, however, projects forward and around the bracket, as FIGS. 1 and 2 show, to constrain the wire spring 134 in place. The commonly-assigned application of Harvey S. Friedman for "Film Unit Deflection System For Self-Developing Camera", Ser. No. 721,992, filed on even date herewith (the disclosure of which is incorporated herein by reference), and the prior patent documents identified therein, discloses further structure and functioning of the spreader bar 48, the blade 50 and the shade 52.

Alternative to using the separate closure panel 68 of electrically-insulating material, whether to close the frame compartment further and/or mount battery contacts 108, the frame bottom wall 58 can extend further along the underside of the transport processor 10a, i.e. can extend further toward the back of the frame from the construction shown in FIG. 2. Also, battery contacts can be mounted to the frame 38 independent of the closure 68. For this alternative, a mounting block (not shown) of electrically-insulating material is molded onto the base portion of each contact 108; an insulating support shoe can also be molded onto the free end of the contact leg portion. The mounting block snaps onto mating structure provided on the frame bridging member 60 to affix the contact to the receptacle frame. This alternative mounting of the contacts can employ a single insulating block molded onto two contacts to mount them both to the frame with proper spacing and alignment. The insulating shoe on the end of each contact leg allows it to rest on the sheet metal bottom wall of the frame without loss of electrical isolation.

Figure 6:
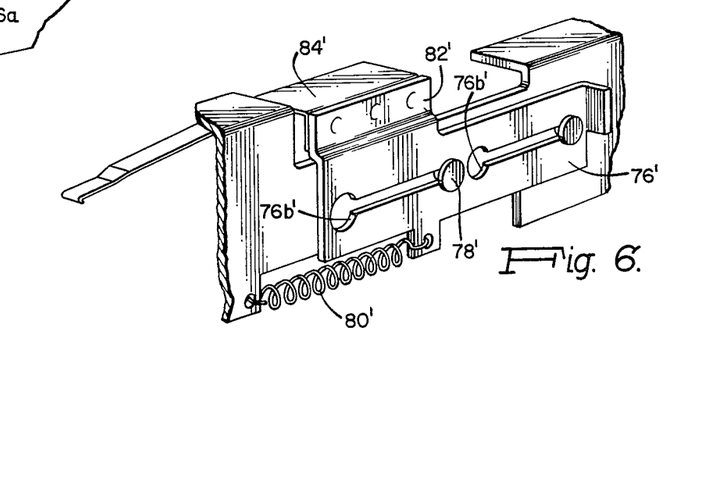
FIG. 6 is an enlarged fragmentary perspective view of an alternative pick device for the receptacle of FIGS. 1 and 2.

FIG. 6 shows an alternative construction of the pick device for use on the receptacle frame 38. The different placement of the return spring 80' and of the arm-mounting web 82' relative to the carriage 76' as shown there illustrate some of the variations available. Moreover, at the back end of each carriage slot there is provided an enlarged opening 76b' through which the head of the fastener 78' which seats in that slot can pass. The provision of such enlarged openings at one extreme end of the carriage slots thus enables the carriage, together with the web and pick arm, to be assembled onto the receptacle frame, and alternatively removed from it and/or replaced, with no tools or further disassembly other than selective engagement or disengagement of the return spring 80'.

The transport receptacle 10a and the processor 10b as described above thus form a highly compact mechanism which provides all the film-engaging functions for a self-developing camera. The two sub-assemblies can readily be separated, as for servicing of the processor, but operate together with secure reliability. The mechanism can be mounted as a unit in a camera with numerous fastenings, including without limitation clamps that secure the receptacle in place and lugs or like projections formed on the outside of the receptacle frame. Moreover, the transport receptacle of the mechanism provides a new and compact unitary structure which provides many film-engaging functions for self-developing photographic equipment. Note should be made that the commonly-assigned patent application of Richard Paglia for "Film-Engaging Photographic Mechanism For Self-Developing Film", Ser. No. 721,855, filed on even date herewith, discloses another film-engaging mechanism of the type described herein.

It will thus be seen that the objects set forth above, among those made apparent from the preceding description, are efficiently attained. Since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In apparatus for engaging self-developing photographic film, in the form of cassette-housed separate card-like film units, in a camera; said apparatus receiving and positioning a replaceable film cassette with the foremost film unit therein located for photographic exposure, advancing the foremost film unit from the cassette, and processing the advanced film unit with fluidic photoprocessing composition which it carries, said apparatus having (i) a transparent receptacle for replaceably receiving a cassette having a casing containing such card-like self-developing film units stacked under an exposure window thereof, said casing further having an exit slot and having an access opening through which the foremost film unit is accessible for dislodgment from the cassette through the exit slot, said receptacle having a front end and a back end, and (ii) a spread-roll processor for such self-developing film units, said processor being hingedly mounted to the receptacle for movement between a first position where it is aligned at the front of the receptacle with a film unit being advanced out of a cassette received in the receptacle, and a second position where the processor is removed from the front of the receptacle clear of the path of a cassette being loaded into and being removed from the receptacle, said apparatus comprising the improvement wherein A. a single metal sheet of substantially uniform thickness forms a top wall, a bottom wall, and first and second side walls of said receptacle to define an open-fronted cassette compartment therein, (1) said top wall having an aperture located above the exposure window of a cassette seated in said receptacle compartment and having first and second side members and back and front members around the periphery of said aperture, (2) said front member of said top wall having to metal sheet configured to form deflection-resistant rib means along the span thereof at least between said side members, (3) said metal sheet additionally forming a set of positioning tab members projecting across the back of said compartment, (4) said compartment-forming walls and said tab member engaging a cassette inserted into said compartment for positioning the cassette relative to the receptacle along three different sides, B. a pick mechanism mounted on said metal sheet for film-advancing movement relative thereto, and projecting a pick arm into said compartment from an actuator-engaging element thereof located outside said compartment, and C. means carried on said metal sheet for pivotally mounting said processor to said receptacle and for fixing the pivotal orientation of said processor relative to said compartment when in said first position thereof and for releasably latching said processor in said first position.

2. A film-engaging transport receptacle for engaging self-developing photographic film, in the form of cassette-housed separate card-like film units, in a camera; said receptacle removably receiving at a front end thereof a replaceable film cassette containing card-like self-developing film units stacked under an exposure window, said casing having a frontal exit slot and having an access opening through which the foremost film unit is accessible for advancement from the cassette through the exit slot, said receptacle positioning such a film cassette received therein with a foremost film unit thereof located for photographic exposure, and advancing the foremost film unit from the cassette for processing with fluidic photoprocessing composition carried with the film unit, said receptacle comprising the improvement wherein
A. a single metal sheet forms a top wall, a bottom wall, and first and second side walls of said receptacle to define an open-fronted, unitary, cassette compartment therein,
   (1) said top wall having an aperture located in register with the exposure window of a cassette seated in said receptacle compartment and having first and second side members and back and front members around the periphery of said aperture,
   (2) said front member of said top wall including integral deflection-resistant rib means configured from the metal sheet and extending along the span thereof at least between said side members,
   (3) said metal sheet additionally forming a set of positioning tab members projecting across the back of said compartment,
   (4) said compartment-forming walls and said tab members engaging a cassette inserted into said compartment for positioning the cassette relative to the receptacle along the back, top and sides thereof,
B. a pick mechanism mounted on said metal sheet for film-advancing movement relative thereto, and projecting a pick arm into said compartment from an actuator-engaging element thereof located outside said compartment, and
C. means carried on said metal sheet for mounting a processor of such film units to said receptacle for selective disposition adjacent the receptacle front in alignment to receive a film unit being advanced out of such a receptacle-seated cassette.

3. A transport receptacle according to claim 2 comprising the further improvement wherein said front member of said top wall comprises deflection-resistant rib means configured of said metal sheet and extending along the entire span thereof between said side walls.

4. A transport receptacle according to claim 2 comprising the further improvement wherein said front member of said top wall has a frontal lip turned upward, away from said bottom wall, to form at least part of said rib means and to provide a rounded entry surface leading under said front member and into said compartment.

5. A transport receptacle according to claim 4 comprising the further improvement wherein said front member of said top wall has an upwardly-turned back lip along the frontal periphery of said aperture to form a further part of said rib means and to provide a rounded exit surface leading under said front member and outward from said receptacle.

6. A transport receptacle according to claim 2
A. further comprising means forming an opening through a compartment-forming wall which extends along the front-to-back spacing, and
B. wherein said pick mechanism comprises a slide carriage movably mounted on said sheet metal and disposed outside of said compartment, and a pick arm carried on said slide carriage and extending through said opening to adjacent the back end of said compartment for engagement therein through the access opening of a cassette seated in said compartment behind a foremost film unit therein and movable upon movement of said slide carriage for dislodging such a foremost film unit from the cassette by way of the exit slot thereof.

7. A transport receptacle according to claim 6 comprising the further improvement wherein
A. said slide carriage is movably mounted on said sheet metal for sliding movement between the back and front ends of the compartment, and
B. a return spring is connected between said slide carriage and the sheet metal for urging the carriage normally to a return position where it disposes the pick arm for engagement behind the back marginal edge of a foremost film unit in a cassette seated in said compartment.

8. A transport receptacle according to claim 6 comprising the further improvement of
A. a mounting slot aperturing said slide carriage and extending along the length thereof in the front-to-back direction relative to said receptacle with a first slot width and having an enlarged second width at one end thereof, and
B. headed carriage-mounting means projecting from a receptacle wall and having a shank portion for passage through the carriage slot and having a head portion which passes through the carriage slot at said second enlarged width thereof but not at said narrower first width thereof, so that said carriage member is removable from said mounting means by passing the enlarged slot thereof over said head portion and is otherwise slidably retained to said receptacle by the engagement of said head portion with the narrow slot portion.

9. A transport receptacle according to claim 2 comprising the further improvement wherein said receptacle bottom wall includes a welded seam of said metal sheet extending between the receptacle front and back.

10. A film-engaging transport receptacle for engaging self-developing photographic film, in the form of cassette-housed separate card-like film units, in a camera; said receptacle removably receiving at a front end thereof a replaceable film cassette containing card-like film units stacked under an exposure window, said cassette having a frontal exit slot and an access opening through which the foremost film unit can be engaged for advancing it through the exit slot for discharge from the cassette, said receptacle positioning such a cassette received therein with a foremost film unit thereof located for photographic exposure, and advancing the foremost film unit from the cassette for processing with fluidic photoprocessing composition carried with the film unit, said receptacle being characterized in that it constitutes a complete mechanism adapted for mounting as a unit in a camera for receiving and selectively positioning such a film cassette, and for engaging such self-developing film units within the cassette and for advancing each such film unit out of the cassette, and further imposing minimal requirements and restraints on non-film engaging elements of the camera, and comprising
A. a unitary receptacle structure having a laterally-extending top wall and laterally-extending first and second side walls and transversely-extending back wall means, said side walls and back wall means being arranged to positioningly engage side and back walls of such a film cassette received in the receptacle and said top wall having an aperture located to be in register with the exposure window of such a cassette, B. an opening in at least one laterally-extending wall of said receptacle, C. a slide carriage on the outside of the receptacle and having means for driving engagement therewith, said carriage being apertured with a mounting slot extending along the length thereof in the front-to-back direction relative to said receptacle with a first slot width and having an enlarged second width at one end thereof, D. headed carriage-mounting means projecting from a receptacle wall and having a shank portion for passage through the carriage slot and having a head portion which passes through the carriage slot at said second enlarged width thereof but not at said narrower first width thereof, so that said carriage member is removable from said mounting means by passing the enlarged slot thereof over said head portion and is otherwise slidably mounted to said receptacle by the engagement of said head portion with the narrow slot portion, E. pick arm means extending from said carriage through said opening to within said receptacle for engagement with the back edge of a foremost film unit in a receptacle-seated cassette, and movable with said carriage for advancing such a film unit frontward and out of the cassette exit slot, and F. means for mounting a processor of such film units to the receptacle for selective disposition adjacent the receptacle front in alignment to receive a film unit being advanced out of a receptacle-seated cassette.

11. A film-engaging transport receptacle for engaging self-developing photographic film, in the form of cassette-housed separate card-like film units, in a camera; said receptacle removably receiving at a front end thereof a replaceable film cassette containing card-like film units stacked under an exposure window, said cassette having a frontal exit slot and an access opening through which the foremost film unit can be engaged for advancing it throught the exit slot for discharge from the cassette, said receptacle positioning such a cassette received therein with a foremost film unit thereof located for photographic exposure, and advancing the foremost film unit from the cassette for processing with fluidic photoprocessing composition carried with the film unit, said receptacle being characterized in that it constitutes a complete mechanism adapted for mounting as a unit in a camera for receiving and selectively positioning such a film cassette, and for engaging such self-developing film units within the cassette and for advancing each such film unit out of the cassette, and further imposing minimal requirements and restraints on non-film engaging elements of the camera, and comprising A. a unitary sheet-metal receptacle frame having laterally-extending top wall members, laterally-extending first and second side walls, a bottom wall, and back wall means, said side walls and back wall means being arranged to positioningly engage side and back walls of such a film cassette received in the receptacle and said top wall members defining an aperture located to be in register with the exposure window of such a cassette, B. an opening in at least one laterally-extending wall of said frame, C. a carriage movably mounted on the outside of said frame and having means for driving engagement therewith, D. pick arm means mountingly secured to said carriage and extending through said opening to within said receptacle for engagement with the back edge of a foremost film unit in a receptacle-seated cassette, and movable with said carriage for advancing such a film unit frontward and out of the cassette exit slot, E. means integral with said frame forming a plate member of said metal sheet, said plate member spanning between said frame side walls and overlying a receptacle-seated cassette above and closely adjacent the exit slot thereof, said plate member including structural elements for resisting deflection outward from within said compartment, and F. means for mounting a processor of such film units to the receptacle for selective disposition adjacent the receptacle front in alignment to receive a film unit being advanced out of a receptacle-seated cassette.

12. A transport receptacle according to claim 11 further comprising a top wall member raised on said receptacle frame to be spaced above the access opening on a film cassette seated in the receptacle and forming thereunder a clearance passage for accommodating said pick arm means above such a cassette within said receptacle.

13. A transport receptacle according to claim 12 further comprising cassette-guiding finger means protruding within said receptacle from a side wall and located below said raised top wall member and substantially in the plane of cassette-engaging top wall members.

14. A transport receptacle according to claim 11 further comprising

A. a pair of contacts for electrically engaging battery terminals on the side of a receptacle-seated film cassette opposite the exposure window thereof, and B. electrically-insulating contact-mounting means replaceably interfitting with said frame for mounting said electrical contacts to said receptacle.

15. A transport receptacle according to claim 11

A. wherein said frame bottom wall extends only partially to the receptacle back and said back wall means span only a portion of the receptacle back, and B. further comprising a closure panel releasably attachable to said frame and having a bottom portion for spanning open portions of the receptacle bottom and having a back portion for spanning open portions of the receptacle back.

16. A transport receptacle according to claim 15 further characterized in that said closure panel spans between said frame side walls at the receptacle back and at the receptacle bottom and includes means for releasably engaging said frame at the side walls and at the back thereof.

17. A transport receptacle according to claim 15 further comprising means on said closure panel for removably mounting electrical contacts positioning said contacts to electrically engage electrical terminals on a receptacle-seated cassette.

* * * * *